United States Patent
Kocic et al.

(10) Patent No.: US 7,388,936 B2
(45) Date of Patent: Jun. 17, 2008

(54) DIGITAL DATA RECEIVER FOR EDGE CELLULAR STANDARD WITH DC OFFSET CORRECTION, CHANNEL IMPULSE RESPONSE ESTIMATION, I/Q PHASE IMBALANCE COMPENSATION, INTERFERENCE ESTIMATION, AND SELECTIVE EQUALIZATION

(75) Inventors: Marko Kocic, Somerville, MA (US); Lidwine Martinot, Belmont, MA (US); Zoran Zvonar, Boston, MA (US)

(73) Assignee: Mediatek, Inc., Hsin-Chu (TW)

( * ) Notice: Subject to any disclaimer, the term of this patent is extended or adjusted under 35 U.S.C. 154(b) by 602 days.

(21) Appl. No.: 10/988,142

(22) Filed: Nov. 12, 2004

(65) Prior Publication Data

US 2005/0204208 A1 Sep. 15, 2005

Related U.S. Application Data

(60) Provisional application No. 60/519,091, filed on Nov. 12, 2003.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. .......... 375/346; 375/319; 375/229; 375/350; 375/285; 455/307; 455/296; 708/300

(58) Field of Classification Search ........ 375/319, 375/229, 346
See application file for complete search history.

(56) References Cited

U.S. PATENT DOCUMENTS

| 4,129,276 | A | * | 12/1978 | Svet ................. 246/169 S |
| 5,592,507 | A | * | 1/1997 | Kobayashi ............ 375/211 |
| 5,715,282 | A | * | 2/1998 | Mansouri et al. ....... 375/350 |
| 5,848,105 | A |   | 12/1998 | Gardner et al. |

(Continued)

FOREIGN PATENT DOCUMENTS

EP 0851637 7/1998

(Continued)

OTHER PUBLICATIONS

"Efficient Computation of the Delay-Optimized Finite-Length MMSE-DFE," Al-Dhahir et al., *IEEE Transactions on Signal Processing*, vol. 44, n. 5 (May 1996).

(Continued)

*Primary Examiner*—Nick Corsaro
*Assistant Examiner*—Gina McKie
(74) *Attorney, Agent, or Firm*—Gauthier & Connors LLP

(57) ABSTRACT

A receiver unit includes a prefilter that receives as one of the inputs a channel impulse response (CIR) estimation data set and removes unnecessary data information from the CIR estimation data set and filters input signal so to form a first output data set. An equalizer core receives the first output data set and based on computed CIR length and SNR value of the first output data set so as to determine which portion of the first output data set are assigned to at least one of at least two low complexity equalization modules used for processing.

15 Claims, 3 Drawing Sheets

U.S. PATENT DOCUMENTS

| | | | |
|---|---|---|---|
| 5,870,433 A * | 2/1999 | Huber et al. | 375/233 |
| 6,504,884 B1 | 1/2003 | Zvonar | |
| 6,608,999 B1 * | 8/2003 | Jakobsson | 455/303 |
| 7,130,359 B2 * | 10/2006 | Rahman | 375/316 |
| 7,224,724 B2 * | 5/2007 | Krupka | 375/229 |
| 2002/0110205 A1 * | 8/2002 | Piirainen | 375/346 |
| 2003/0099310 A1 | 5/2003 | Zvonar | |

FOREIGN PATENT DOCUMENTS

| | | |
|---|---|---|
| EP | 1311093 | 5/2003 |
| EP | 1337083 A1 * | 8/2003 |
| WO | WO 01/31867 | 5/2001 |
| WO | WO 02/067444 | 8/2002 |

OTHER PUBLICATIONS

"Reduced-State Sequence Estimation for Coded Modulation on Intersymbol Interference Channels," Eyuboglu et al., *IEEE J. on Selected Areas in Communications*, vol. 7, n. 6 (Aug. 1989).

"Equalization Concepts for EDGE," Gerstacker et al., *IEEE Transactions on Wireless Communications*, vol. 1, n. 1 (Jan. 2002).

"Enhanced DC Estimation via Sequence-Specific Frequency Offset," Hui et al., *IEEE* (2002).

"Reduced-Complexity Map Equalizer for Dispersive Channels," Lopez et al., *IEEE* (2000).

"An Overview of EGPRS: the packet data component of Edge," Molkdar et al., *Electronics & Communications Engineering Journal*, (Feb. 2002).

"Channel Estimation for EGPRS Modems," Yakhnich et al., *IEEE* (2001).

"Delayed Decision-Feedback Sequence Estimation," Duel-Hallen et al., *IEEE* (1989).

"An Efficient Method for Prefilter Computation for Reduced-State Equalization," Gerstacker et al., *IEEE* (2000).

"Edge Data Receiver Design," Grant et al., *IEEE* (2003).

"Using a Direct Conversion Receiver in Edge Terminals-A New DC Offset Compensation Algorithm," Lindoff, *IEEE* (2003).

"Advanced Signal-rocessing Algorithms for Energy-Efficient Wireless Communications," Luschi et al., *Proceedings of the IEEE*, vol. 88, n. 10 (Oct. 2000).

"A Comparison of Optimal and Sub-Optimal Map Decoding Algorithms Operating in the Log Domain," Robertson et al., *IEEE* (1995).

* cited by examiner

DIGITAL DATA RECEIVER FOR EDGE CELLULAR STANDARD WITH DC OFFSET CORRECTION, CHANNEL IMPULSE RESPONSE ESTIMATION, I/Q PHASE IMBALANCE COMPENSATION, INTERFERENCE ESTIMATION, AND SELECTIVE EQUALIZATION

PRIORITY INFORMATION

This application claims priority from provisional application Ser. No. 60/519,091 filed Nov. 12, 2003, which is incorporated herein by reference in its entirety.

BACKGROUND OF THE INVENTION

The invention relates to the field of communication receivers, and in particular to a receiver design that provides a unique way to reach and exceed the performance levels required by the EDGE cellular standard, taking into consideration propagation conditions, overall modem performance, and implementation complexity of a receiver.

Digital data receiver designs is a critical part of the EDGE system development, providing a base for performance differentiation through the type approval and operator acceptance process, and afterwards even more as a driver of complexity and power of the wireless terminal. In the case of EDGE, this is critical because of the complex modulation format, different modulation and coding scenarios, and possibility of link adaptation, which further stresses the importance of a high performance data receiver design. Furthermore, specific implementations of EDGE receivers have to take into account imperfections of RF front end (e.g., DC offset, I/Q gain and phase imbalance, phase noise, analog filters) and digital receive filters that can be part of a mixed signal chip. However, performance of the EDGE data receiver depends on a number of factors that a designer cannot influence (e.g., propagating conditions, interference) as well as selection of parameters of the receiver in a given scenario, which provides a multidimensional problem in making design choices even when the elements of the receiver are known from prior art.

SUMMARY OF THE INVENTION

According to one aspect of the invention, there is provided a method of performing operations of a digital receiver unit. The method includes receiving data, sampling and storing the data in a sample buffer. An average is computed of the sampled data in the sample buffer so as to aid in estimating an initial DC offset of the sampled data. The initial DC offset estimate is subtracted from the sampled data to form a second set of data. The method also includes performing an I/Q phase imbalance estimation and correction on the second set of data to form a third data set. A channel impulse response (CIR) estimation is performed on the third data set to form a fourth data set. An estimation of the number and position of the remaining CIR taps with respect to the largest energy tap associated with the fourth data set is performed to form a fifth data set. An estimation of the interference associated with the fifth data set is performed so as to suppress adjacent channel interference (ACI) and co-channel interference (CCI). A filtering operation is performed to remove the interference in accordance with whether the fifth data set is associated with ACI or CCI interference to form a sixth data set. A channel impulse response estimation is performed on the sixth data set to form a seventh data set. The CIR length and SNR value of the seventh data set is computed so as to determine which of at least two low complexity equalization modules are used for processing.

According to another aspect of the invention, there is provided a receiver unit for a communication system. The receiver unit includes a prefilter that receives as one of inputs a channel impulse response (CIR) estimation data set and forms a first output data set. An equalizer core receives the first output data set and based on computed CIR length and SNR value of the first output data set so as to determine which portion of the first output data set are assigned to at least one of at least two low complexity equalization modules used for processing.

According to another aspect of the invention, there is provided a method of performing the operations of an equalizer in a receiver unit for a communication system. The method includes receiving as one of inputs a channel impulse response (CIR) estimation data set. Unnecessary data information is removed from the CIR estimation data set so to form a first output data set. The CIR length and SNR value of the first output data set is computed so as to determine which portion of the first output data set are assigned to at least one of at least two low complexity equalization modules used for processing.

According to another aspect of the invention, there is provided a method of performing operations of a digital receiver unit. The method includes receiving data and storing the data in a sample buffer. An average is computed of the sampled data in the sample buffer so as to aid in estimating an initial DC offset of the sampled data. The initial DC offset estimate is subtracted from the sampled data to form a second set of data. The method also includes performing an I/Q phase imbalance estimation and correction on the second set of data to form a third data set. An estimation of the interference associated with the third data set is performed so as to suppress adjacent channel interference (ACI) and co-channel interference (CCI) to form a fourth data set. A filtering operation is performed to remove the interference in accordance with whether the fourth data set is associated with ACI or CCI interference to form a fifth data set. A channel impulse response estimation is performed on the fifth data set to form a sixth data set. The CIR length and SNR value of the sixth data set is computed so as to determine which of at least two low complexity equalization modules are used for processing.

DETAILED DESCRIPTION OF THE INVENTION

Figure 1:
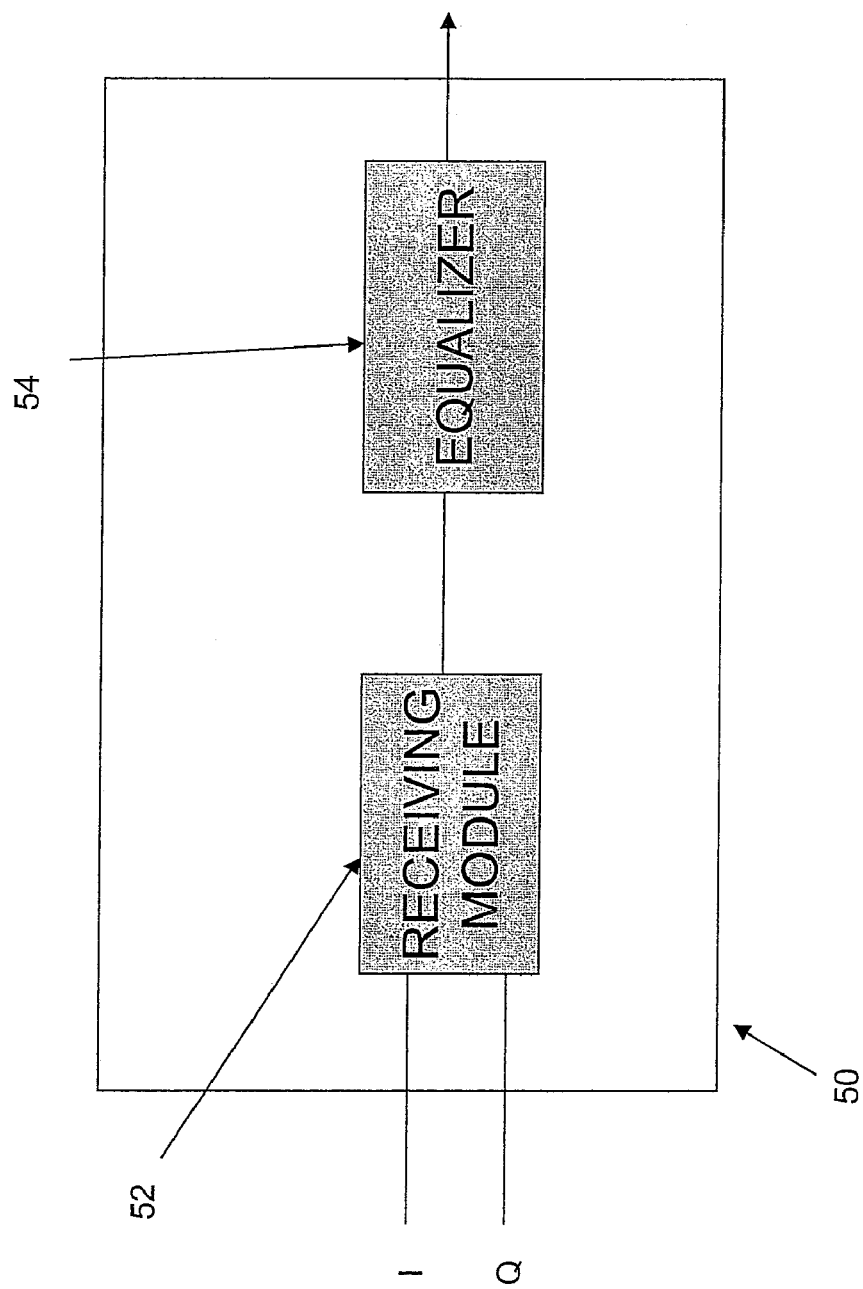
FIG. 1 is a schematic block diagram illustrating the inventive data receiver system.

FIG. 1 illustrates a schematic block diagram of the inventive data receiver system 50. The data receiver system 50 includes a receiver module 52 and an equalizer 54. The receiver module 52 receives and I and Q samples and performing the necessary operations, as such CIR estimations, so that the equalizer 54 can utilize its output for processing. Both the receiver module 52 and equalizer 54 performs various inventive routines that vastly aids in increasing performance of the receiver system 50.

Figure 2:
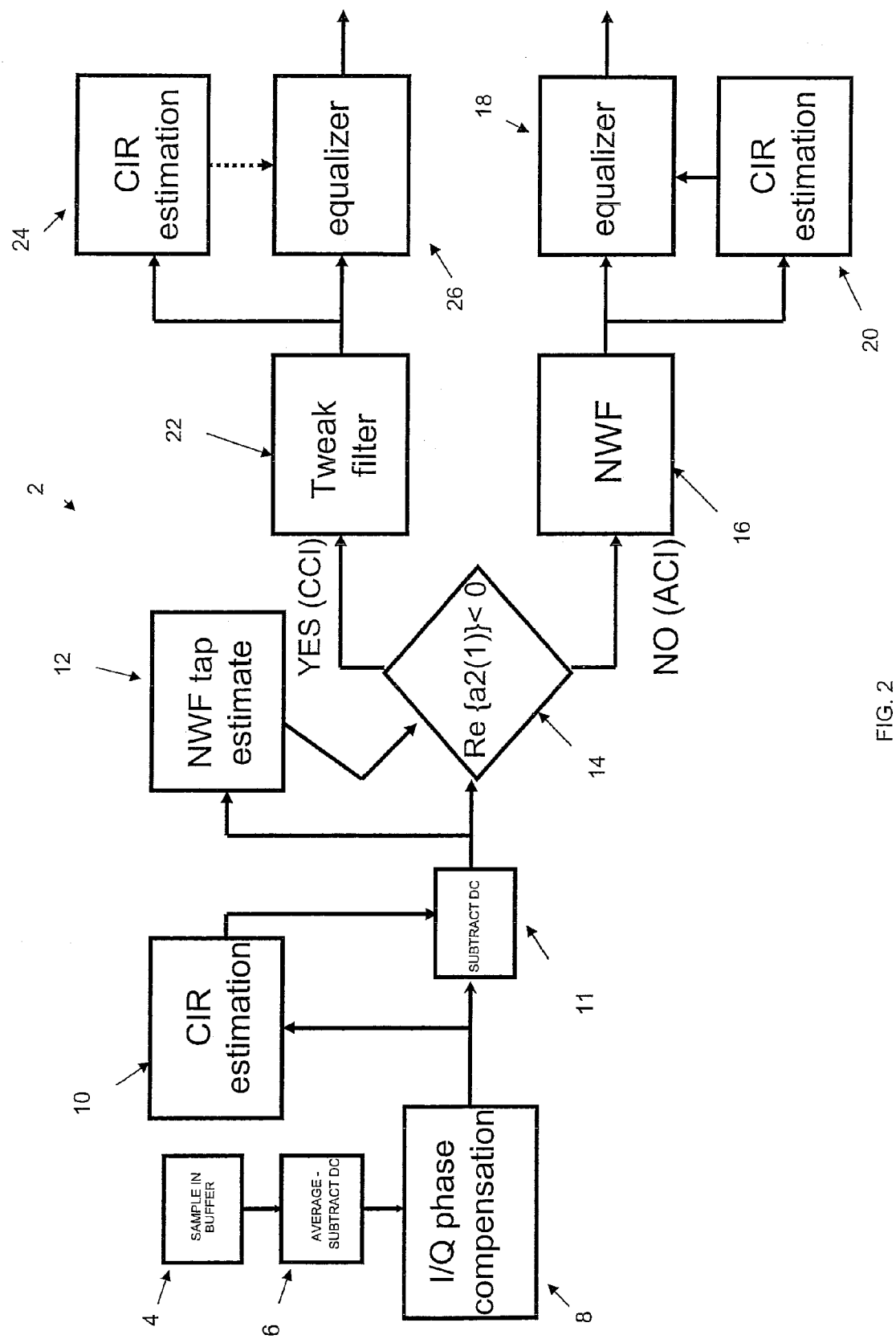
FIG. 2 is a flow chart of the operations performed by a data receiver in accordance with the invention.

FIG. 2 illustrates a basic flow chart 2 of the operations performed by a receiver module 52. The receiver module 52 receives I and Q samples are stored in a buffer, as shown in step 4. The I and Q samples are sampled at one sample per symbol sampling rate. Receiver signal samples are denoted by $r_i$ where i=1 to N. Next a rough estimate is provided to subtract initial DC offset, as shown in step 6. An average of the received signal buffer is computed to estimate the initial DC offset, so that the buffer now contains samples denoted as $y_i$, where i=1 to N.

$$A = \frac{1}{N}\sum_{i=1}^{N} r_i \qquad \text{Eq. 1}$$

$$y_i = r_i - A \text{ for } i = 1 \ldots N$$

The average is subtracted in order to remove DC offset, which can be several times larger than the desired signal. However, this introduces residual DC offset, which is a function of the Channel Impulse Response (CIR), transmitted data and noise, so that DC offset is not fully removed. Nevertheless, the residual DC offset is usually much smaller than the original DC offset.

Afterwards, the next operation is to estimate and compensate for I/Q phase imbalance of the RF front-end, as shown in step 8. In particular, a signal $y_i$ is received that is a complex signal, with Real and Imaginary parts, usually referred to as I and Q signals. The I/Q phase imbalance algorithm is based on the assumption of orthogonality of I and Q signals in EDGE 8PSK modulation format. I/Q phase imbalance $\theta$ is estimated as:

$$\hat{\theta} \approx \frac{\sum_{i=1}^{N} I_i Q_i}{\sum_{i=1}^{N} I_i^2 + \sum_{i=1}^{N} Q_i^2}. \qquad \text{Eq. 2}$$

where $y_i = I_i + jQ_i$. A new I/Q phase imbalance estimate $\hat{\theta}_j$ is obtained every burst. These burst based estimates need to be averaged in some way for acceptable performance. One way of doing that is by using an exponential filter, or by simply averaging all obtained burst based estimates. The choice of averaging/filtering approach depends on the characteristics of the I/Q phase imbalance. Simple averaging is preferable in case of constant (static) I/Q phase imbalance, while exponential filtering is preferable in case of slowly varying I/Q phase imbalance. The received signal $y_i$ is corrected using the averaged I/Q phase estimate as:

$$I_{c,i} = I_i - \theta Q_i; Q_{c,i} = Q_i - \theta I_{c,i}. \qquad \text{Eq. 3}$$

Note that the above equations imply that the correction is done sequentially. First, the I signal is corrected using Q signal. Then, the Q signal is corrected using the corrected I signal, denoted by $I_c$. Thus, the original signal is denoted by $y_i = I_i + jQ_i$, while the corrected signal is denoted by $y_{c,i} = I_{c,i} + jQ_{c,i}$. Note that the results to estimate and compensate for I/Q phase imbalance of step 8 are provided to step 11. Step 11 removes the estimated residual DC offset from the output results to estimate and compensate for I/Q phase imbalance.

Step 10 is the channel estimation block, which includes of a) timing estimation obtained by cross-correlation with midamble, including position of the main tap of channel impulse response (CIR), b) CIR estimation including unknown composite channel taps estimation, number of taps, signal to noise ratio in the burst and quality indicator in the burst. CIR estimation is conducted jointly with DC offset estimation to ensure necessary quality of the DC offset estimate for a 8-PSK signal. To control the performance of the data receiver and its complexity, adaptive channel truncation can be applied to limit the number of taps that is taken for processing in an equalizer.

CIR estimation is based on known symbols, embedded in the middle of every received data burst, the Training Sequence (TS). Due to uncertainties in synchronization, the precise position of the TS within the received signal buffer is not known. Thus, the first stage in CIR estimation is to estimate the location of the TS. This is done by cross-correlating the received signal with the TS. The peak of the cross-correlation function denotes the start of the replica of the TS corresponding to the largest energy CIR tap (the received signal includes of several replicas, or echoes, of the original signal, each one corresponding to one of the CIR taps).

Afterwards, the invention needs to estimate the number and position of the remaining CIR taps with respect to the largest energy tap, shown as step 12. This is achieved by selecting the set of length L (where L can be 5 or 7) maximum energy taps that always include the highest energy tap. The timing (start of the Training Sequence) is adjusted based on the selected taps and, if necessary, shifted with respect to the maximum energy tap.

Both the CIR taps and the residual DC offset (DCO) are jointly estimated. Joint CIR and DCO estimations used in the prior art can be used for this purpose as described in U.S. patent application Ser. No. 10/689,330, which is referred herein in its entirety.

Final products of CIR estimation are estimated CIR taps, $h_i$, where i=0 to L−1, and L is the length of the CIR, and the estimate of the residual static DC offset, B. At the end of the CIR estimation, as shown in step 11, estimated residual DC offset is removed from the received signal:

$$s_i = y_{c,i} - B \text{ for } i=1 \ldots N. \qquad \text{Eq. 4}$$

CIR estimation also produces several related parameters that are used in later stages of the algorithm, such as the Soft Value Scaling Factor (SVSF) used in computation of soft bit values, and Signal to Noise Ratio (SNR) estimate used in computation of the prefilter.

Step 14 illustrates the procedure to suppress the interference. Note that step 14 utilizes the results of step 11. There are two types of interference, Adjacent Channel Interference (ACI) and Co-Channel Interference (CCI). ACI comes from transmission in-channels other than the desired user channel, in the user's and neighboring cells. First ACI, representing modulated signal one channel spacing away from desired signal, is usually the biggest problem. On the other hand, CCI is due to base-station transmitting on the same channel, in neighboring cells. Interference suppression algorithms differ depending whether the major source of interference is of ACI or CCI type. Thus, in interference suppression, one needs an estimate of the interference type and is performed adaptively on a burst-by-burst basis. This is done by estimating the spectrum of the interference. First, one can use the estimated CIR to obtain the estimate of the interference, $n_i$:

$$n_i = s_i - \sum_{j=0}^{L-1} h_j d_{i-j}. \quad \text{Eq. 5}$$

Next, one can use $n_i$ to estimate auto-correlation function of the interference, $r_{nn}(i)$. Auto-correlation function for only two delays, zero and one is defined as $$r_{nn}(i) = \frac{1}{N-L+1} \sum_{j=L+i-1}^{N-1} n(j)n(j-i)*. \quad \text{Eq. 6}$$

Then, autocorrelation coefficients can be used to compute the linear prediction, or whitening filter for the interference. Filter taps are computed by solving the Yule-Walker equations, which can be written in matrix form as $Ra_M = p$, where $$R = \begin{bmatrix} r_{nn}(0) & r_{nn}^*(1) & \cdots & r_{nn}^*(M-1) \\ r_{nn}(1) & r_{nn}(0) & \cdots & r_{nn}^*(M-2) \\ \vdots & \vdots & \ddots & \vdots \\ R_{nn}(M-1) & r_{nn}(M-2) & \cdots & r_{nn}(0) \end{bmatrix} \quad \text{Eq. 7}$$

$$p = [\,r_{nn}(1) \quad r_{nn}(2) \quad \cdots \quad r_{nn}(M)\,]$$

and $a_M$ is the linear prediction filter. Note that the first tap of $a_M$ is always equal to one. The Yule-Walker equations can efficiently be solved using Levinson-Durbin algorithm. In this case M is equal to 2, so that the only non-zero filter tap is computed as:

$$a_2(1) = r_{nn}(1)/r_{nn}(0). \quad \text{Eq. 8}$$

Tap $a_2(1)$ is a complex number. It is used for classification of the interference. Tap $a_2(1)$ determines the location of the only zero in the linear prediction filter. Since, $a_M$ is also a whitening filter, its frequency response is roughly a reciprocal of the interference frequency response. Thus, in case of CCI type interference, $a_M$ will tend to be a high pass filter, while in case of ACI type interference its frequency response will include null at the peak of the ACI interference power (usually about 100 kHz, depending on the digital Rx filter). One way of characterizing whitening filter's frequency response is through the real part of coefficient $a_2(1)$. If the real part of coefficient $a_2(1)$ is negative, whitening filter frequency response includes a null, indicating ACI-type interference. On the other hand, if the real part of coefficient $a_2(1)$ is positive, the whitening filter frequency response is high pass, indicating CCI-type interference.

The interference suppression technique uses different filtering strategies depending on the estimated interference type. In case of ACI-type interference, adaptively estimated 2-tap whitening filter is applied on the received signal, as shown as step 16. Unlike the approaches in the prior art, this filter is not pre-computed and fixed but is rather adaptively changed on a burst-by-burst basis. In case of CCI-type interference a fixed 2-tap IIR or tweak filter is applied on the received signal, as shown in step 22. The fixed CCI filter is high pass and its frequency response approximates that of an equalizer for the Gaussian C0 pulse, a fixed part of the 8PSK EDGE signal CIR and a part of the EDGE modulator that compresses an 8PSK EDGE signal in the GSM GMSK spectrum. After interference suppression, the CIR is again estimated using the same procedure as in step 10, as shown in steps 18 and 24 to reflect the new overall impulse response introduced by the additional filtering for interference suppression. The newly computed CIR is used as an input to the equalization which is set up accordingly based on the SNR and the channel length L to provide the most efficient performance versus computational complexity tradeoff.

Figure 3:
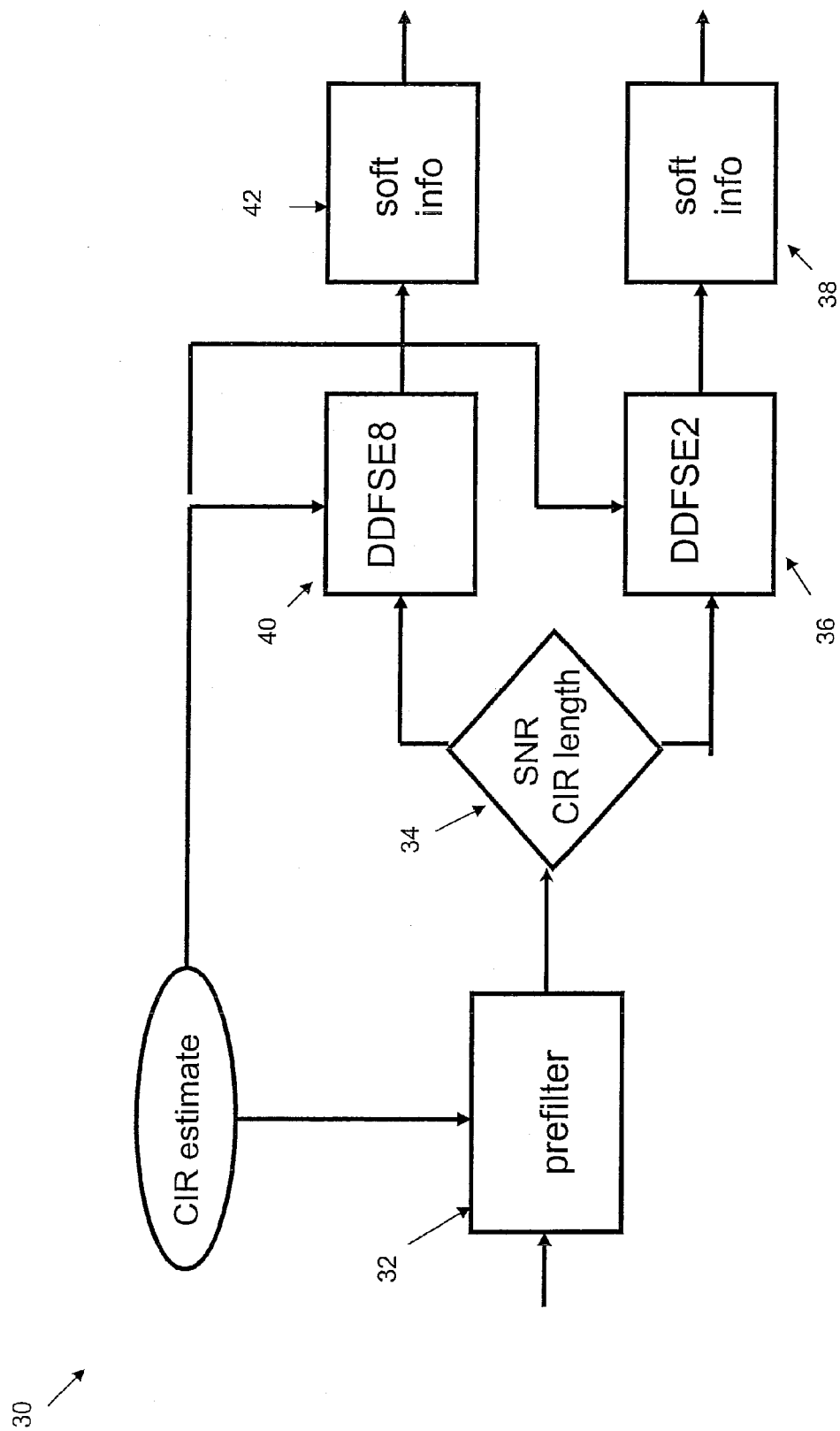
FIG. 3 is a flow chart of the operations performed by an equalizer in accordance with the invention.

The equalizer is computationally the most complex part of a data receiver, as shown in the flow chart 30 of FIG. 3. Step 32 shows the result or CIR estimate of the step 18 or 24 being used to determine the coefficients of a pre-filter. The pre-filter of step 32 can also remove the $3\pi/8$ rotation that is a part of the EDGE 8PSK modulation and that was inserted by a modulator/transceiver. Note that the received signal can be "derotated", prior to prefiltering, for example before CIR estimation. The output of the pre-filter is processed by an equalizer of the complexity determined by the condition of step 34.

Since the equalizer is the most complex part of the data receiver, several approaches have been derived in the prior art to reduce the complexity, including Reduced State Sequence Estimation (RSSE) and Delayed Decision Feedback Sequence Estimator (DDFSE) approaches. Either of the two techniques can be used in a data receiver, however the specific size of the problem is determined in each of the branches adaptively, setting up the appropriate equalizer block based on the SNR computation and CIR length estimate.

The invention can use an equalizer that is a standard Reduced State Sequence Estimation (RSSE) (N,1, 1, . . . ) core, where N can be 8, 4, or 2. RSSE cores differ from optimal Maximum Likelihood Sequence Estimation (MLSE) cores, because RSSE includes several "states" that are merged in order to reduce complexity. Thus, a RSSE core can be considered to be a cross between a MLSE and a Decision Feedback Equalizer (DFE) core. In the RSSE, the CIR is split in two parts, one corresponding to the MLSE and the other to the feedback correction term. Thus, the metric used to select the best candidate received sequence is given by:

$$\left| s_n = \sum_{i=0}^{L_1-1} h_i d_{n-i} - \sum_{i=L_1}^{L-1} h_i \hat{d}_{n-i} \right|^2 \quad \text{Eq. 9}$$

where $s_i$ is the received signal after CIR estimation and interference suppression, $h_i$ are CIR taps (after interference suppression) and $d_i$ are possible transmitted symbols. Taps 0 to $L_1$ are included in the "MLSE portion" of the CIR, while taps from index $L_1$ to L−1 are CIR taps included in the feedback correction term. In case of RSSE (N, 1, 1, 1, . . . ) $L_1$ is equal to 1 only, while L can be 5 or 7. Also, the CIR estimate can be updated after every symbol, or after several symbols to compensate for CIR time variation and Doppler shift due to movement of the receiver.

Another commonly used equalization technique with reduced complexity is the Delayed Decision Feedback Sequence Estimator (DDFSE). The DDFSE divides the CIR estimate into two parts, one of which is equalized using a Maximum Likelihood Sequence Estimation (MLSE) type receiver while the other part is accounted for by subtraction of expected received signal value due to those taps. Thus, for example, if L=7 taps, DDFSE can detect only the first two taps using MLSE, while the expected contribution of the remaining 5 taps is subtracted.

To further reduce the complexity some of the states, the DDFSE can be combined thus reducing the total number of states in the trellis of 8-PSK from 8 to a smaller number (e.g. 2). This results in smaller complexity at the price of performance degradation. Based on the SNR estimate and channel length of step 34 one can use either DDFSE2 or DDFSE8 in the received burst and establish tradeoff between performance and computational load, as shown in steps 36 and 40.

Smaller number of states provides lower complexity, which affects the performance of the receiver. However, smaller numbers of states is used only for high enough SNR and short enough channels where the performance required by a standard can be achieved even with smaller number of states. This in turn reduces overall computational complexity of the data receiver (on average) which results in power reduction for the handset operation. The decision whether to employ more or less complex equalization technique, as shown in FIG. 3, is made based on the SNR estimate and the length of the CIR estimate (L), as shown in step 34. At higher SNR satisfactory performance can be achieved even with low complexity techniques, so that high complexity technique can be reserved for low SNR channels.

Following the equalization soft information is delivered to channel decoder, as shown in steps 38 and 42. Soft bit computation and type of quantization also affect the performance of the receiver. Since EDGE transmission is based on a burst by burst basis quality indication of the burst quality, SVSF, is merged into soft decision information.

Soft bit information can be produced in several ways. One possible way is by using the suboptimal Max-Log-Maximum A Posteriori (Max-Log-MAP) algorithm known as Soft Output Viterbi Equalizer (SOVE).

Unlike the true Max-Log-MAP, which is bi-directional, SOVE is a unidirectional algorithm similar in this case to the original Viterbi algorithm. Thereby produced soft bit information is normalized and scaled by the SVSF. Thus, the final output of the receiver algorithm includes of a sequence of hard bits (an estimate of the originally transmitted sequence), and a sequence of soft bits (information), corresponding to the likelihood that the hard bit sequence was correctly detected.

EDGE system dynamics requires that CIR estimation be repeated every burst, while the CIR changes slowly enough over the duration of one burst so that adaptive CIR estimation within burst is not necessary, apart from phase and frequency error correction. Digital phase locked loop can be coupled with equalization to provide frequency shift tracking within a burst.

Phase error estimation is the most frequent CIR adaptation mechanism used in trellis-type processing equalizer cores. Phase error is adaptively estimated, either every symbol, or every several symbols, based on the CIR estimate and the equalizer core path error/state. The phase error estimate for a state n is used to pre-correct phase error in state n+1.

Digital PLL is based on the idea of estimating phase error so that the estimated phase error minimizes the overall estimation error, given channel estimate h and the received samples y(n).

The steepest descent algorithm can be used for phase estimation. In the steepest descent algorithm, at time instant n+1 the estimate of parameter a is obtained as:

$$a(n+1) = a(n) + 0.5\mu\left[-\frac{\partial |e(n)|^2}{\partial a}\right] \qquad \text{Eq. 10}$$

where is a constant and e(n) is the estimation error at time instant n. In our case error e(n) is defined as:

$$e(n)=y(n)e^{-j\Theta(n)}-h*d(n) \qquad \text{Eq. 11}$$

where h and d(n) are vectors defined as h=[$h_0$ $h_1$ $h_2$ . . . $h^{N-1}$]$^T$ and d(n)=[d(n) d(n-1)d(n-2). . . d(n-N+1)]$^T$·$h_i$ are estimated channel taps and d(n) input data estimates at the output of the equalizer. Differentiating |e(n)|$^2$ with respect to θ one gets $$\frac{\partial |e(n)|^2}{\partial \theta} = \frac{\partial (y(n)e^{-j\theta(n)} - h^*d(n))^*(y(n)e^{-j\theta(n)} - h^*d(n))}{\partial \theta} \qquad \text{Eq. 12}$$

$$\frac{\partial |e(n)|^2}{\partial \theta} = \frac{\partial -y(n)^*e^{j\theta(n)}h^*d(n)}{\partial \theta} + \frac{\partial -y(n)e^{-j\theta(n)}d(n)^*h}{\partial \theta} = \qquad \text{Eq. 13}$$
$$-jy(n)^*e^{j\theta(n)}h^*d(n) + jy(n)e^{-j\theta(n)}d(n)^*h$$

$$\frac{\partial |e(n)|^2}{\partial \theta} = -2\,\text{Im}\{y(n)e^{-j\theta(n)}d(n)^*h\}. \qquad \text{Eq. 14}$$

Thus the phase estimate is updated as:

$$\theta(n+1)=\theta(n)+\alpha_1 2Im\{y(n)e^{-j\theta(n)}d(n)^*h\}. \qquad \text{Eq. 15}$$

where constant $\alpha_1$ corresponds to constant μ from above. This phase estimation algorithm corresponds to the first order digital PLL. The second order digital PLL can be obtained by modifying the phase estimate to include the second term.

$$\theta(n+1) = \theta(n) + \alpha_1 2\,\text{Im}\{y(n)e^{-j\theta(n)}d(n)^*h\} + \qquad \text{Eq. 16}$$
$$\alpha_2 \sum_{i=0}^{n-1} 2\,\text{Im}\{y(i)e^{-j\theta(i)}d(i)^*h\}$$

Constant $\alpha_2$ is usually equal to $\alpha_1/10$ and its purpose is to smooth the estimates. It can be shown that, provided phase error per symbol is small, the second term is proportional to the LO frequency error and can be used as an estimate of that parameter, and used to drive the Automatic Frequency Correction (AFC) loop.

Although the present invention has been shown and described with respect to several preferred embodiments thereof, various changes, omissions and additions to the form and detail thereof, can be made therein, without departing from the spirit and scope of the invention.

What is claimed is:

1. A method of performing operations of a digital receiver unit comprising:
   receiving data and storing the data in a sample buffer;
   computing an average of the sampled data in said sample buffer so as to aid in estimating an initial DC offset of said sampled data;
   subtracting said initial DC offset from said sampled data to form a second set of data;
   performing an I/Q phase imbalance estimation and correction on said second set of data to form an third data set;

performing a joint DC offset and channel impulse response (CIR) estimation on said third data set and subtracting said DC offset to form a fourth data set;

performing an estimation of the number and position of the remaining CIR taps with respect to the largest energy tap associated with the fourth data set to form a fifth data set;

performing an estimation of the interference associated with said fifth data set so as to suppress adjacent channel interference (ACI) and co-channel interference (CCI);

performing a filtering operation to remove the interference in accordance with whether said fifth data set is associated with ACI or CCI interference to form a sixth data set;

performing a channel impulse response estimation on said sixth data set to form a seventh data set; and computing the CIR length and SNR value of said seventh data set so as to determine which of at least two low complexity equalization modules are used for processing.

2. The method of claim 1, wherein said I/Q phase imbalance estimation is defined as $$\hat{\theta} \approx \frac{\sum_{i=1}^{N} I_i Q_i}{\sum_{i=1}^{N} I_i^2 + \sum_{i=1}^{N} Q_i^2}$$

where I and Q are said data stored in said sample buffer.

3. The method of claim 1, wherein said channel impulse response estimation comprises a timing estimation obtained by cross-correlation with midamble, including position of the main tap of channel impulse response.

4. The method of claim 1, wherein said channel impulse response estimation comprises unknown composite channel taps estimation, number of taps, signal to noise ratio in a burst and quality indicator in the burst.

5. The method of claim 1, wherein said channel impulse response estimation is conducted jointly with DC offset estimation to ensure necessary quality of the DC offset estimate for a 8-PSK signal.

6. The method of claim 1, wherein suppression of said ACI interference comprises utilizing an estimated 2-tap whitening filter to form a filtered signal.

7. The method of claim 1, wherein suppression of said CCI interference comprises utilizing a fixed 2-tap IIR or tweak filter to formed a filtered signal.

8. The method of claim 6, wherein suppression of said ACI interference comprises performing a channel impulse estimation on said filtered signal.

9. The method of claim 7, wherein suppression of said CCI interference comprises performing a channel impulse estimation on said filtered signal.

10. A method of performing operations of a digital receiver unit comprising:

receiving data and storing the data in a sample buffer;

computing an average of the sampled data in said sample buffer so as to aid in estimating an initial DC offset of said sampled data;

subtracting said initial DC offset from said sampled data to form a second set of data;

performing an I/Q phase imbalance estimation and compensation on said second set of data to form an third data set;

performing an estimation of the interference associated with said third data set so as to suppress adjacent channel interference (ACI) and co-channel interference (CCI) to form a fourth data set;

performing a filtering operation to remove the interference in accordance with whether said fourth data set is associated with ACI or CCI interference to form a fifth data set;

performing a channel impulse response estimation on said fifth data set to form a sixth data set; and computing the CIR length and SNR value of said sixth data set so as to determine which of at least two low complexity equalization modules are used for processing.

11. The method of claim 10, wherein said I/Q phase imbalance estimation is defined as $$\hat{\theta} \approx \frac{\sum_{i=1}^{N} I_i Q_i}{\sum_{i=1}^{N} I_i^2 + \sum_{i=1}^{N} Q_i^2}$$

where I and Q are said data stored in said sample buffer.

12. The method of claim 10, wherein suppression of said ACI interference comprises utilizing an estimated 2-tap whitening filter to form a filtered signal.

13. The method of claim 10, wherein suppression of said CCI interference comprises utilizing a fixed 2-tap IIR or tweak filter to formed a filtered signal.

14. The method of claim 12, wherein suppression of said ACI interference comprises performing a channel impulse estimation on said filtered signal.

15. The method of claim 13, wherein suppression of said CCI interference comprises performing a channel impulse estimation on said filtered signal.

* * * * *